(12) United States Patent
Bowen

(10) Patent No.: US 6,853,366 B2
(45) Date of Patent: *Feb. 8, 2005

(54) ARTICULATOR AND OPTICAL DETECTION CURSOR POSITIONING DEVICE

(76) Inventor: James H. Bowen, 13442 Crimson La., Linden, VA (US) 22642

( * ) Notice: Subject to any disclaimer, the term of this patent is extended or adjusted under 35 U.S.C. 154(b) by 229 days.

This patent is subject to a terminal disclaimer.

(21) Appl. No.: 10/268,719

(22) Filed: Oct. 11, 2002

(65) Prior Publication Data

US 2004/0070568 A1 Apr. 15, 2004

(51) Int. Cl.⁷ ................................. G09G 5/08
(52) U.S. Cl. ................. 345/163; 345/161; 345/165; 345/166; 345/164
(58) Field of Search ............................. 345/163, 165, 345/161, 166, 158, 164; 341/20; 258/231.16

(56) References Cited

U.S. PATENT DOCUMENTS

| | | | | |
|---|---|---|---|---|
| 3,526,775 A | * | 9/1970 | Friedrich et al. | 250/221 |
| 3,603,982 A | * | 9/1971 | Patti | 341/31 |
| 3,761,919 A | * | 9/1973 | Baumann | 341/131 |
| 4,417,824 A | * | 11/1983 | Paterson et al. | 400/477 |
| 4,534,668 A | * | 8/1985 | Hildel et al. | 400/477 |
| 5,446,481 A | | 8/1995 | Gillick et al. | 345/163 |
| 5,491,479 A | * | 2/1996 | Wilkinson | 341/58 |
| 5,543,821 A | * | 8/1996 | Marchis et al. | 345/167 |
| 5,644,127 A | | 7/1997 | Ohmae | 250/231.16 |
| 5,674,018 A | * | 10/1997 | Kaufman et al. | 400/473 |
| 5,681,122 A | * | 10/1997 | Burke | 400/472 |
| 5,697,718 A | * | 12/1997 | Erler et al. | 400/714 |
| 5,808,568 A | | 9/1998 | Wu | 341/20 |
| 5,912,661 A | | 6/1999 | Siddiqui | 345/166 |
| 5,917,473 A | | 6/1999 | Yeh | 345/163 |
| 6,014,130 A | | 1/2000 | Yung-Chou | 345/163 |
| 6,034,671 A | | 3/2000 | Cheng et al. | 345/163 |
| 6,056,457 A | * | 5/2000 | Chao | 400/472 |
| D438,847 S | * | 3/2001 | Hasegawa | D14/412 |
| 6,201,534 B1 | * | 3/2001 | Steele et al. | 345/157 |
| 6,215,420 B1 | * | 4/2001 | Harrison et al. | 341/22 |
| 6,273,623 B1 | * | 8/2001 | Chao | 400/472 |
| 6,300,942 B1 | | 10/2001 | Chin et al. | 345/165 |
| 6,411,281 B1 | * | 6/2002 | Sasselli et al. | 345/163 |
| 6,603,460 B2 | * | 8/2003 | Hua-Yung | 345/163 |
| 2003/0076296 A1 | * | 4/2003 | Kolybaba | 345/156 |

* cited by examiner

Primary Examiner—Andrew H. Hirshfeld
Assistant Examiner—Wasseem H. Hamdan

(57) ABSTRACT

A cursor positioning device that can be sealed if the environment requires sealing, that can withstand harsh use, and can position the cursor easily and quickly. In operation the where the operator places their fingers on the positioning articulator and rocks or slides the articulator in the direction they want the cursor to move. And with movement signatures do single and double clicks, and character strings to the host computer, either through the mouse port or the keyboard port. The key and articulator interrupters block optical beams for key and mouse like positioning thus eliminating any physical contact or force from articulator to detecting optics. Cursor position is positioned by an interrupter disposed in a ring of optical emitters and detectors, whereas depending on the position of movement by the positioning interrupter emission is blocked, or partially blocked, between a particular pair or pairs of emitters and detectors, that particular pair or pairs being the direction of cursor movement. The amount of articulator movement is the distance the cursor moves.

24 Claims, 16 Drawing Sheets

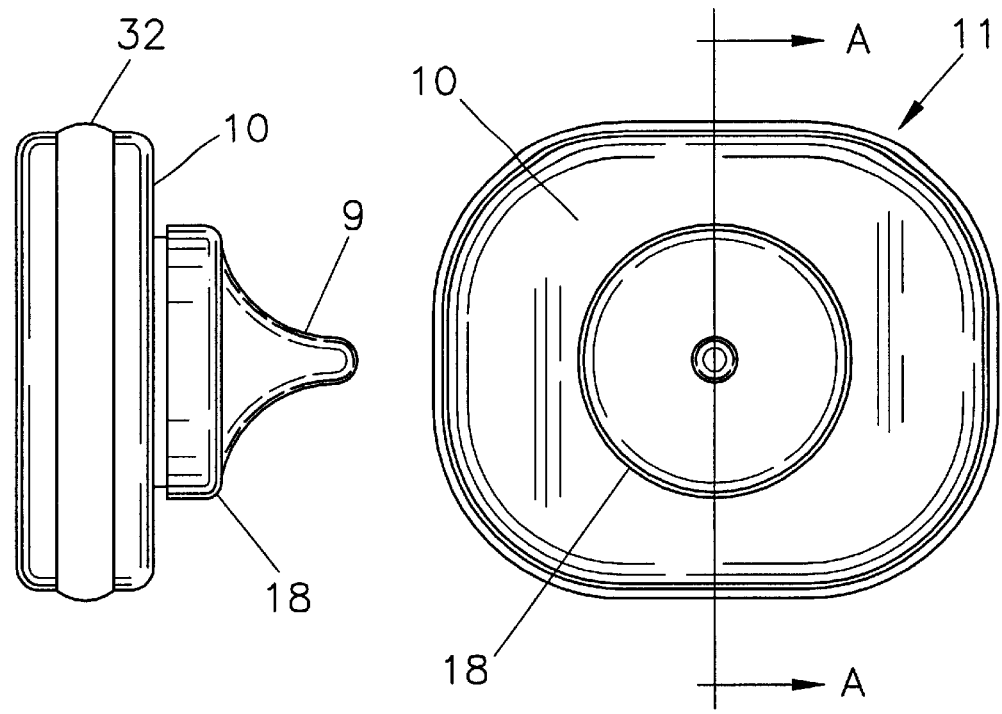
*FIG. 1A*          *FIG. 1*
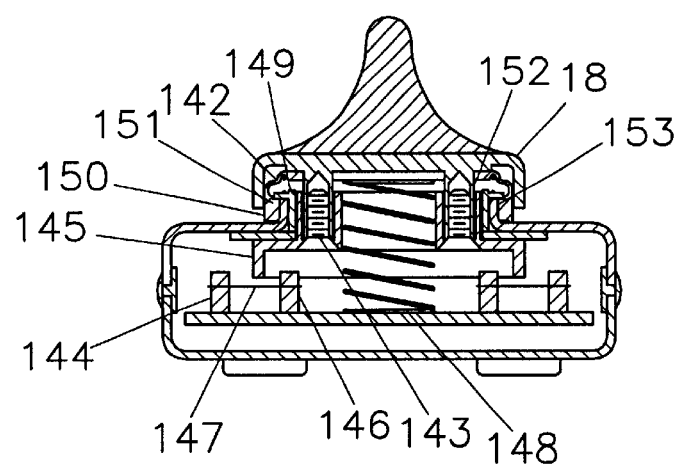
*FIG. 1B*

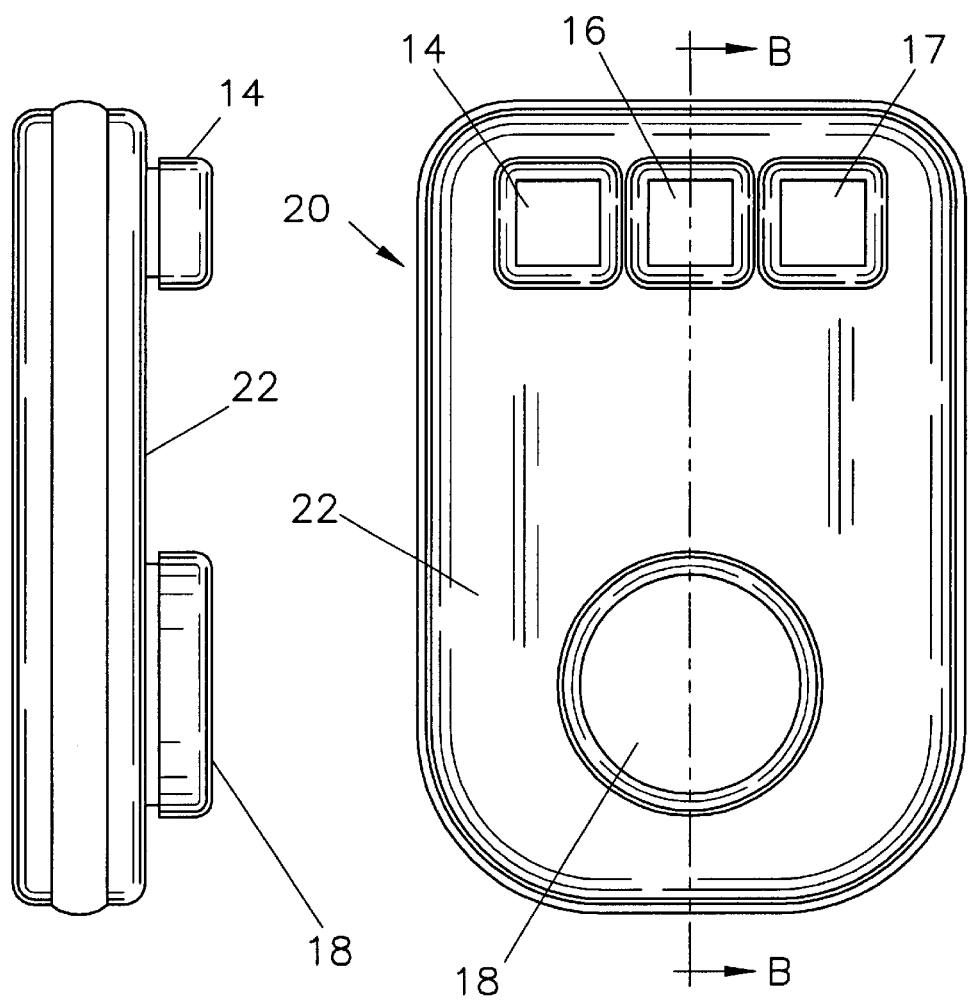
FIG. 2A  FIG. 2
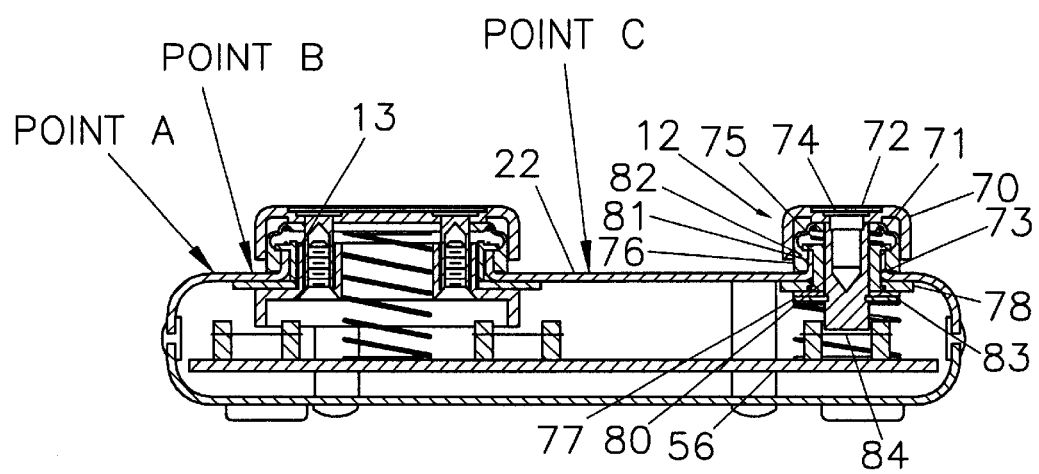
FIG. 3

ARTICULATOR AND OPTICAL DETECTION CURSOR POSITIONING DEVICE

BACKGROUND OF THE INVENTION

1. Field of the Invention

The present invention generally relates to mouse type input devices for computers that need data entry in office and harsh environments, both indoor and outdoor, and in public access areas.

2. Description of the Prior Art

Prior art mouse type input devices fall into five basic category types: rotating mechanism, strain mechanism, electronic touch positioning, optical surface detecting and switch.

Rotating mechanisms include the most common and widely used whereas a ball is in contact with a surface, either a hand or desk, and the relative movement of the hand or distance traveled over a surface rotates either an optical counter or potentiometer. Other variations include joysticks and wheels that are moved and in turn rotate an optical counter or potentiometer. None of these types have been successfully sealed because if a contaminate gets on the ball or wheel it is forced past the seal and into the rotating mechanism. And just the fact that there is a rotating mechanism with bearings, balls, shafts, and wheels means the MTBF is less that if they were not needed. Strain type input devices are stressed in the direction of desired cursor movement and that direction is interpolated in the strain gage and sent to the host computer. These devices generally having a stem for operation similar to a joystick are sealed with an elastomer boot that cracks with age or can be cut by a vandal. And if severe strain is applied will damage the sensor because normal operation requires contact with the sensor.

Capacitive and resistive type touch pads interpolate a touched finger movement to direct a cursor and input single and double clicks. These are contact sensitive type devices whereas sharp object will damage the device. The main environment of use is in notebook computers where limited use is necessitated and generally only by one user, and where an user-friendlier mouse would be an extra peripheral.

Optical surface detection mice read differences in the surface they rest on as they are moved around in an area to show cursor positional differences. Harsh environments or on irregular surfaces limit the use of such devices.

Arrays of switches are also used for four or eight quadrant direction of cursor movement. These types of input devices are not user-friendly because of limited angular positioning of the cursor.

SUMMARY OF THE INVENTION

It is therefor the primary objective of this invention to provide a cursor positioning device that can be sealed if the environment requires sealing, that can withstand harsh use, and can position the cursor easily and quickly.

The key and articulator interrupters block optical beams for key and cursor positioning detection, thus eliminating any physical contact or force from the user from the key or articulator to any detection components. The cursor positioning device being a positioning interrupter disposed between an inner and outer ring of optical emitters and detectors, whereas depending on the amount of movement and the position of movement by the interrupter emission is varied between a particular pair of emitters and detectors, that point is the direction of cursor movement.

In design if the environment requires sealing an island or plurality of islands are disposed on a top surface of the cursor positioning device and place a key position in each island. As with an island when fluid is introduced it is only held in depth by surface tension and the viscosity of the fluid. The top surface of this cursor positioning device is a planar or descending surface from the base of the island to at least one, or part thereof, side of the cursor positioning device periphery. These islands with the key and articulator having the section of an umbrella, even without seals, or if a physical seal fails, give the invention an inherent resistiveness from external fluids to interior cursor positioning device fluid contamination.

It is a further object of this invention to have a cursor positioning device that is stationary, and does not require an area to physically move the cursor positioning device around in.

It is a further object of this invention to have a cursor positioning device that totally controls the cursor, left and right clicks, and preprogrammed computer input control functions from one articulator by movement signatures.

It is a further object of this invention to have stainless steel or other material key and articulator that are only removable by releasing them from within the cursor positioning device.

It is a further object of this invention to have a seal protected by the key or articulator whereas only the thick non-flexing portion of the seal is exposed to a user.

It is also a further object of this invention to have optical detectors whereas in the most depressed position require no physical contact with any of the detection means.

It is also a further object of this invention when a key or articulator is in the most depressed position the key cap or articulator is against the cursor positioning device top surface protecting all internal parts from pressure, or force from harsh use or a vandals blow.

It is also a further object of this invention to allow the cursor positioning device to be easily cleaned.

It is also a further object of this invention to alternatively have a top surface, key caps, key interrupters, and cursor control device fabricated from plastic.

And it is also a further object of this invention to alternatively have a planar top surface with fasteners stepped in from the periphery to facilitate attaching the cursor positioning device to a mounting surface.

BRIEF DESCRIPTION OF THE DRAWINGS

The foregoing and other objects, aspects and advantages will be better understood from the following detailed description of the invention with reference to the drawings, in which:

FIG. 1 is a plan view of a cursor positioning device with a single actuator in accordance with the teachings of this invention;

FIG. 1A is a side view of the cursor positioning device with a single actuator of FIG. 1 in accordance with the teachings of this invention;

FIG. 1B is a section view through the cursor positioning device in FIG. 1 in accordance with the teachings of this invention;

FIG. 2 is a plan view of a cursor positioning device in accordance with the teachings of this invention;

FIG. 2A is a left side view of the cursor positioning device in FIG. 2 in accordance with the teachings of this invention;

FIG. 3 is a section view through the mouse of FIG. 2 in accordance with the teachings of this invention;

DETAILED DESCRIPTION OF THE INVENTION

Figure 4:
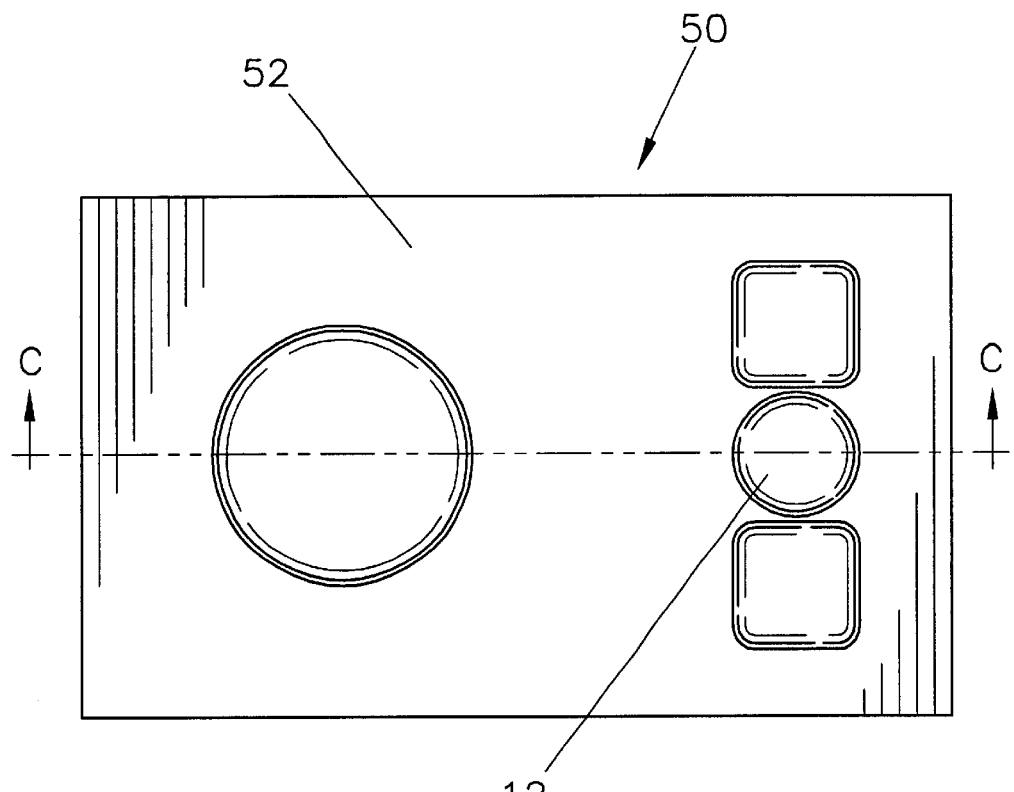
FIG. 4 is a plan view of a mountable cursor positioning device with a planar top surface in accordance with the teachings of this invention.

Referring now to the drawings, in which the same reference numeral indicates the same element in the various figures, FIG. 1 shows a top surface 10 of cursor positioning device 11 and cursor articulator 18 used to position a cursor. Articulator top 9 shows a shape that can be used by one finger to position the cursor, and stops a vandal from hitting articulator 18 with a fist. Cursor positioning device 11 is a full function mouse in as much as all control of the cursor and related functions are preformed with cursor articulator 18. Clicking is preformed by down up movement, speed of down up movement and location of down up movement making up a signature for a single or double click or drag as required for cursor functions. FIG. 1A is a side view of FIG. 1 with top surface 10, side view of cursor articulator 18 and peripheral seal 32. FIG. 1B is a cross section view at A—A through the mouse in FIG. 1. Cursor articulator 18 is retained by fasteners 143 being threadably received into projections 152 coming from the lower side of cursor articulator 18 holding circular interrupter 145 rigid against projections 152. Projections 152 are pressed through cursor upper flex part 142 of cursor elastomer seal 151 forming an upper seal to stop liquids from entering the interior of the cursor positioning device. Cursor lower thick part 150 of cursor elastomer seal 151 is pressed over cursor extruded island 153 forming a lower seal to stop liquids from entering the interior of the cursor positioning device. Cursor lower thick part 150 is the only part of the seal that is exposed to users, so even if lower thick part 150 is completely cut through, bushing 149 will hold cursor lower thick part 150 in place so the seal to the inside of the mouse will not be broken. Cursor upper flex part 142 is protected by key cap 70 so the user cannot cut or damage it.

Cursor bushing 149 is slideably received in cursor extruded island 153. Circular interrupter 145 is slideably received in cursor bushing 149 with enough clearance to allow angular movement of circular interrupter 145. The periphery of circular interrupter 145 is allowed to float in the downwardly direction only being opposed by mouse spring 148, and when depressed the periphery of circular interrupter 145 can block or partially block the cursor optical beam 147 emitting from emitter 146 and being detected by detector 144.

The cursor positioning device in FIG. 2 showing a three button mouse 20 with a top surface 22, a left button 14 and right button 17 for normal left and right clicks. Cursor movement is preformed by the same cursor articulator 18 as in FIG. 1. Center button 16 can be used for sensitivity of cursor movement whereby downward movement of cursor articulator 18 verses linear movement of the cursor on a display device can be adjusted. This adjustment is made by a series of center button 16 depressions that increment and decrement the sensitivity. Center button 16 in some applications could be programmed for a drag function, but in most applications drag is preformed by holding down the left button and then positioning the cursor with cursor articulator 18. Center button 16 could also be programmed to input the scrolling feature like the wheel on a standard type mouse. FIG. 2A is a left side view of FIG. 2 showing the side view of left button 14 and the left side of cursor articulator 18.

FIG. 3 is a section view through FIG. 2 at B—B rotated 90 degrees. Key indicia 72 in FIG. 3 can be press fit or adhesively attached in key cap 70 of key 12 over press-in threaded insert 74. Key indicia 72 can be printed on adhesive coated plastic or embossed in or printed on metal. These options allow key indicia 72 to be in color or have custom text so they can be installed after the keyboards have been assembled.

Key stem 80 is press fit over threaded insert 74 and is slideably received in bushing 73. Key stem 80 is pressed through upper flex part 71 of physical elastomer key seal 82 forming an upper seal to stop liquids from entering the interior of the cursor positioning device. Lower thick part 76 of a physical elastomer seal 82 is pressed over extruded island 81 forming a lower seal to stop liquids from entering the interior of the mouse. Lower thick part 76 is the only part of the seal that is exposed to users, so even if lower thick part 76 is completely cut through, bushing 73 will hold lower thick part 76 in place so the seal to the inside of the cursor positioning device will not be broken. Upper flex part 71 is protected by key cap 70 so the user cannot cut or damage it. Bushing 73 is slideably received in extruded island 81 and is held in place by snaps 83 over washer 78. Once snaps 83 engage over washer 78 bushing 73 retains key seal 82 in a contact position with mouse top surface 22. Although elastomer key seal 82 is a physical seal, even when removed the inherent seal in the design of the extruded island gives the cursor positioning device a means of sealing the interior of the cursor positioning device. Points A, B, and C show that these surfaces are all below extruded island top 13, so even if a seal would fail the fluids would drain to the periphery of the cursor positioning device rather than going inside to contaminate components.

Key retainer 77 is slideably received over key stem 80 and secures keys 12. By retaining key 12 in this manner, the only way to remove key 12 is by from within the mouse. Optical beam 84 is blocked by key stem 80 when key 12 is in the depressed position.

Upper spring 75 returns key 12 to a non-depressed position and maintains a bias pressure on upper flex part 71 of elastomer key seal 82. Each time a key is pressed upper flex part 71 is also forced up to the under side of key cap 70 to assure position is maintain during the life of the cursor positioning device.

Figure 5:
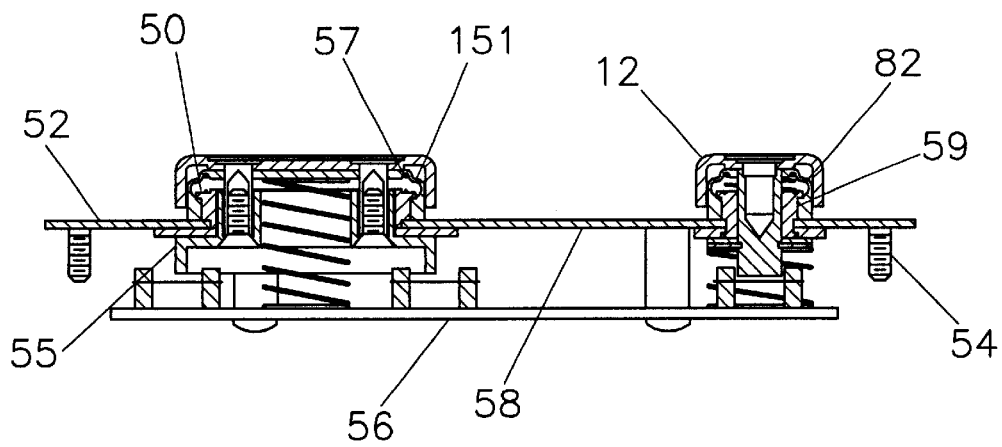
FIG. 5 is a section view through the mountable cursor positioning device with a planar top surface of FIG. 4 in accordance with the teachings of this invention.

FIG. 4 shows mouse 50 with a planar top surface 52 and key 12. FIG. 5 showing the C—C cross section view through FIG. 5 with planar top surface 52 with key 12 and mounting studs 54. Those skilled in the art will recognize that while key 12 is shown round it should be appreciated it could just as easily be square like key 16 of FIG. 2. Mouse 50 in FIGS. 4 and 5 are to be mounted to a desk, machine or other structure with mount studs 54 disposed inwardly around the periphery of rear planar surface 58. Printed wiring board 56 mounts and connects the electronic components of mouse 50.

Figure 6:
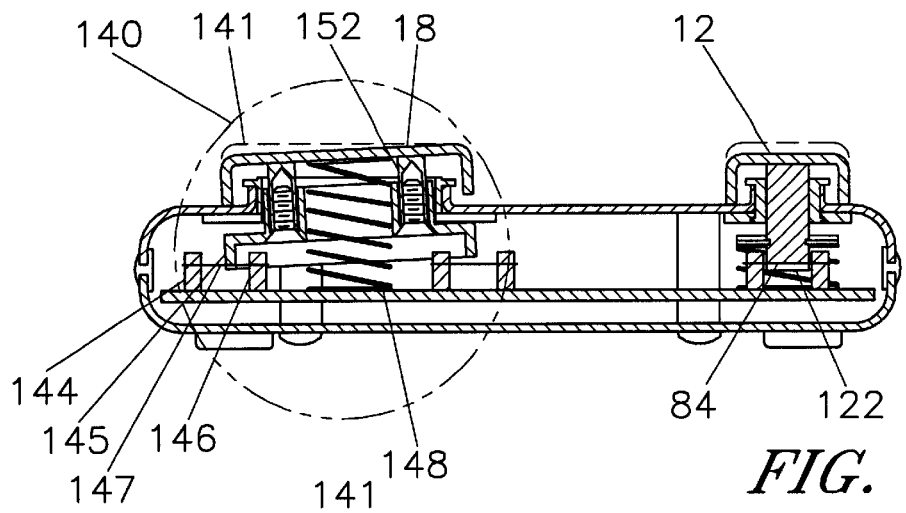
FIG. 6 is a section view through the cursor positioning device of FIG. 2 that is alternatively non-sealed in accordance with the teachings of this invention.

FIG. 6 shows the cross section at A—A of FIG. 2. Key 12 is shown in a depressed position with weld on stem interrupter 122 blocking beam 84. Detail 140 shows the cursor control device of the cursor positioning device. Cursor articulator 18 is shown in a depressed position. The periphery of circular interrupter 145 is allowed to float in the downwardly direction only being opposed by cursor positioning device spring 148, and when depressed the periphery of circular interrupter 145 can block or partially block the cursor optical beam 147 emitting from emitter 146 and being detected by detector 144.

Figure 6A:
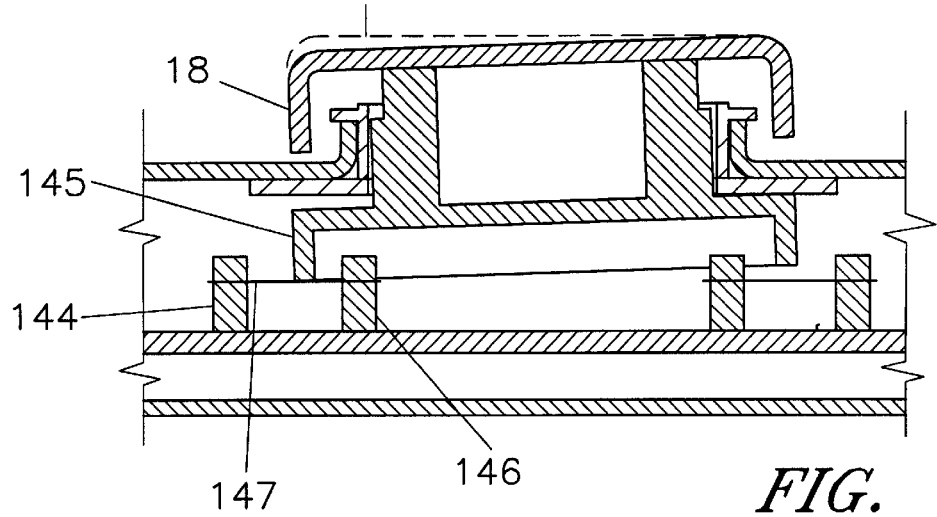
FIG. 6A is an enlarged detail view of FIG. 6 with the circular interrupter in an intermediate position in accordance with the teachings of this invention.
Figure 6B:
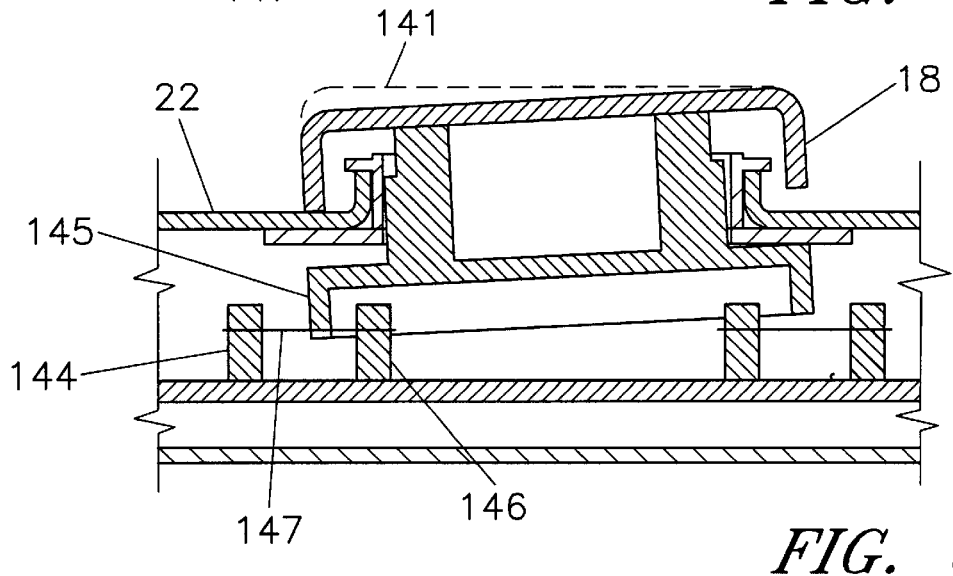
FIG. 6B is an enlarged detail view of FIG. 6 with the circular interrupter in a full downward position in accordance with the teachings of this invention.

FIG. 6A is an enlargement of detail 140 of FIG. 6 with some of the internal parts removed for clarity to better show circular interrupter 145 in a partially blocked position. As shown circular interrupter 145 can partially block the cursor optical beam 147 emitting from emitter 146 and being detected by detector 144. FIG. 6B is an enlargement of detail 140 of FIG. 6 with some of the internal parts removed for clarity to better show circular interrupter 145 in a fully blocked position, and to show that in the most downward position that cursor articulator 18 will contact the top surface 10 to stop harsh use or excessive force prior to damage of internal parts. As shown circular interrupter 145 can block the cursor optical beam 147 emitting from emitter 146 and being detected by detector 144.

Figure 7:
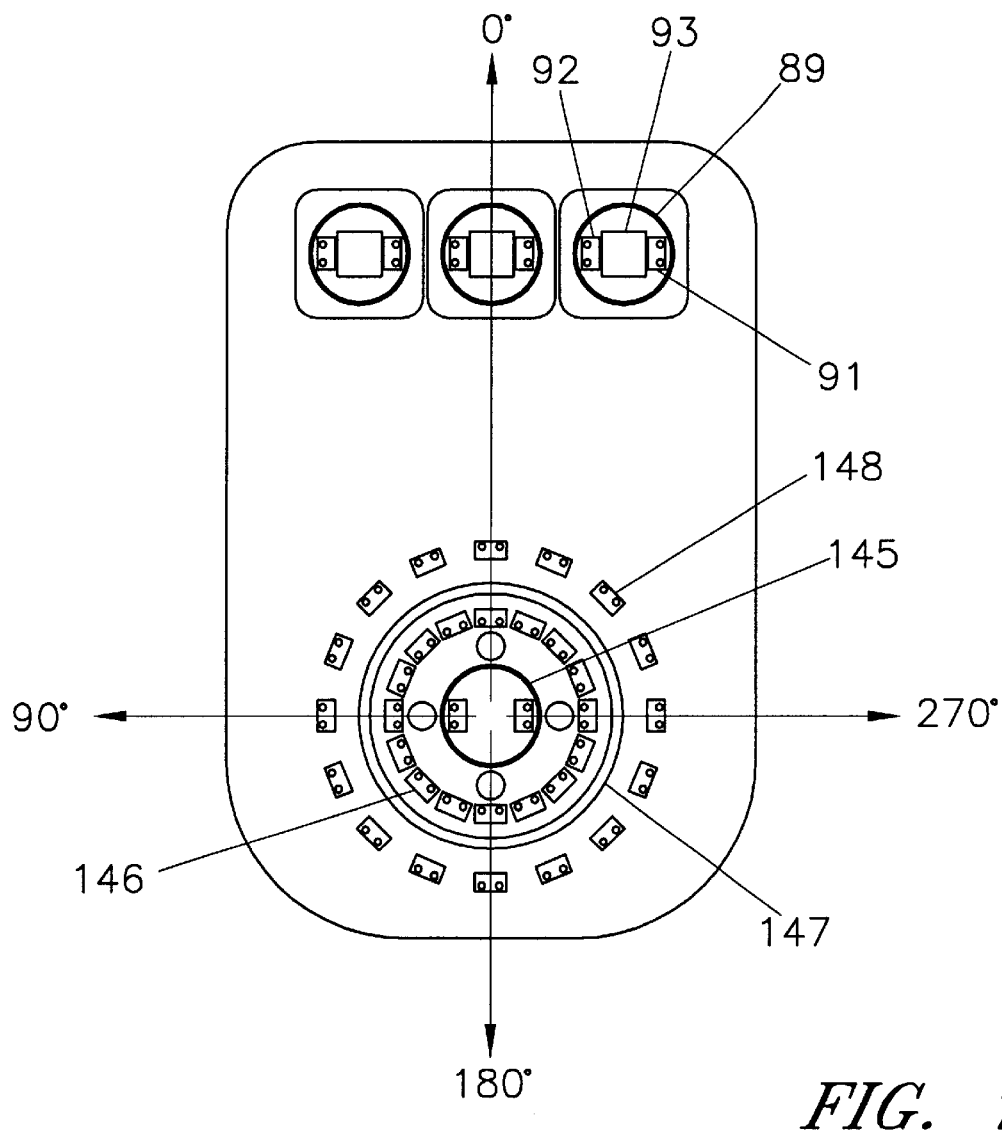
FIG. 7 is a mechanical schematic illustrating the relationship of the emitters and detectors to the key and circular interrupters of the cursor positioning device of FIG. 2 in accordance with the teachings of this invention.

FIG. 7 is a mechanical schematic illustrating the relationship of the emitters and detectors to the key and circular interrupters of the mouse. Lower key spring 89 is disposed around emitter 91 and detector 92 and stem interrupter 93 disposed between emitter 91 and detector 92. Stem interrupter 93 is shown with a square cross section but it should be appreciated that the cross section could be another polygon or even round. A cross section other than round inherently limits key rotation about the center axis of stem interrupter 93.

The downwardly positioning circular interrupter 147 is disposed between and concentric with the center of an inner circular ring of optical emitters 146 and an outer circular ring of detectors 145, whereas depending on the amount of downward movement and the position of downward movement by circle interrupter 147 emission is blocked, or partially blocked, between a particular pair of emitters and detectors that point the direction of cursor movement. It should be appreciated by those skilled in the art that the inner ring could be detectors and the outer ring could be emitters, the number of emitters and detectors could vary and produce a similar result. The numbers of degrees shown about the center of circular interrupter 147 depict the relation to cursor movement. If the cursor is to be moved up the display then pressing circular interrupter 147 at angle zero would direct the cursor in that direction, if pressing the at angle 270 the cursor would move to the right on the display. Sixteen emitter detector pairs are shown giving sixteen direct angles of cursor movement. Angular interpolation between any two of the sixteen pairs can be made to give to give a resolution greater than the sixteen direct angles. The distance that the cursor moves is related to the distance circular interrupter 147 is depressed. This distance can be scaled to be a course or finer movement.

Movement signatures can be made in any one of the direct or interpolated angles. Whereas if an operator made a movement signature in the direction between the zero and ninety degrees shown at forty five degrees the cursor positioning device could input a series of commands to match an action to be made in a particular program, example while in a net browser, the forty five degree movement signature could equal a tab being sent to the computer to highlight the command prompt line for a web address to be input. This would save time in as much as the operator would not have to move the cursor to the command prompt line and then left click, instead it would only be a quick movement of the articulator in the forty five degree direction.

Figure 7A:
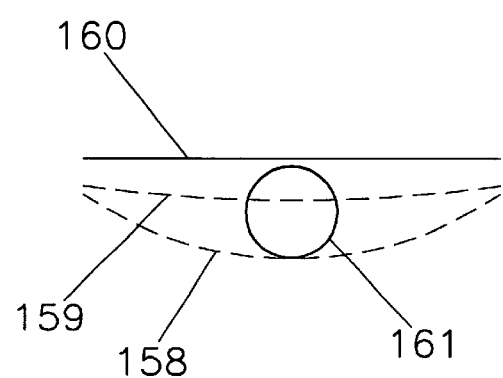
FIG. 7A is a diagram of the optical beam illustrating the effect of the varying downward movement of the circular interrupter on the optical beam in accordance with the teachings of this invention.

FIG. 7A is a diagram viewing optical beam 161 through the axis of cursor optical beam 147 as shown in FIG. 14A illustrating the effect of the varying downward movement of circular interrupter 147 on optical beam 161 at various positions of downward movement. Line 160 shows the lower edge of circular interrupter in the non-depressed position. First curved line 159 shows the radius formed when one side of circular interrupter is moved in a downward direction. Second curved line 158 shows the radius gets smaller as circular interrupter 147 is positioned in a further downward position. As seen by line 160 when circular interrupter 147 is in the non-depressed position optical beam 161 between inner ring emitters 146 and outer ring detectors 145 all see a flat line. As soon as circular interrupter 147 is depressed downward the smallest amount a radius is formed and the lowest point of that radius through angle interpolation between the closest emitter detectors point the cursor in the direction of desired cursor movement.

When the cursor positioning device has only cursor articulator 18 and no keys for left, right button or drag a signature including the location of depression is used to determine which function is being required. The location for the movement signature for left button is at 90 degrees as shown in FIG. 7, for right button is 270 degrees, drag is 0 degrees, and for sensitivity is 180 degrees. Depending on the application the signature functions at 0, 90, 180, and 270 degrees can be changed to other locations, or some functions could be omitted. In operation to do a right click a user would depress and release the cursor articulator 18 at 270 degrees in the time frame necessary to match that down up movement signature and a right click would be input to the host computer. If the operator would depress cursor articulator 18 slower then the cursor would move in the angular direction of the depression. Because slower would not meet the down up timing signature of a click. These locations being controlled in firmware can obviously be changed to match different applications.

Figure 8:
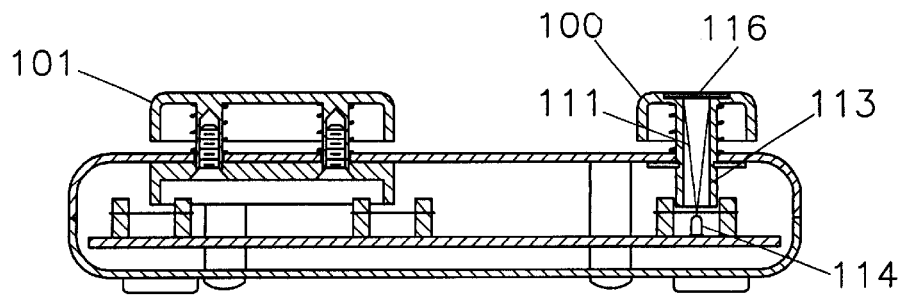
FIG. 8 is a section view through the cursor positioning device of FIG. 2 that is alternatively non-sealed in accordance with the teachings of this invention.

In environments that do not require seals either because of lower cost or where contamination is not a factor FIG. 8 is a section view through FIG. 2 at B—B showing mouse 20 without seals. Molded key 100 and molded cursor articulator 101 are shown. Those skilled in the art will recognize that while molded key 100 is shown in a position to actuate an optical switch it should be appreciated it could just as easily actuate a mechanical switch with standard type contacts. Hollow stem interrupter 113 can allow LED beam 111 to be emitted from key stem LED 114 to illuminate through translucent indicia lens 116 showing an input has been made to the host computer, or that the host computer has input data to the mouse.

Figure 9:
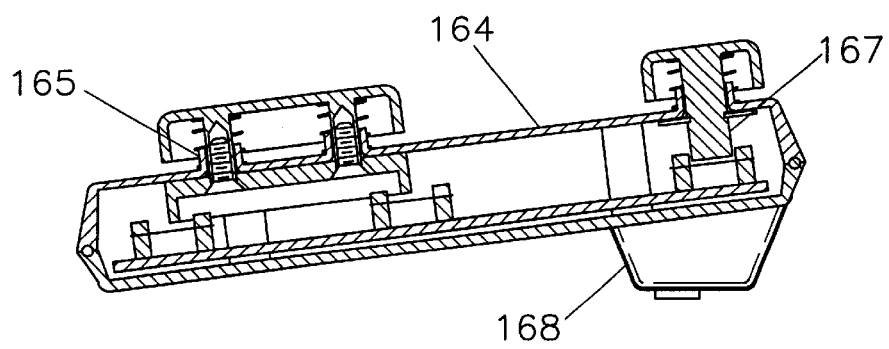
FIG. 9 is a section view through the cursor positioning device of FIG. 2 when molded and without seals in accordance with the teachings of this invention.

Top surface 164 of FIG. 9 is similar to top surface 22 of FIG. 2 in as much as it functions the same except that it is of less expensive molded construction. Molded island 165 is shown and can be molded from a material with high lubricity so no bushing is needed to slideably receive key stem 167. In this configuration the only sealing means is the inherent umbrella and island design of the invention. It can be seen that molded island 165 gives an inherent resistiveness to fluids because the fluid would have to reach the depth of the height of molded island 165 before it would overflow into the mouse. Angle foot 168 is added to elevate the rear of the cursor positioning device to a different angle for typing.

Figure 10:
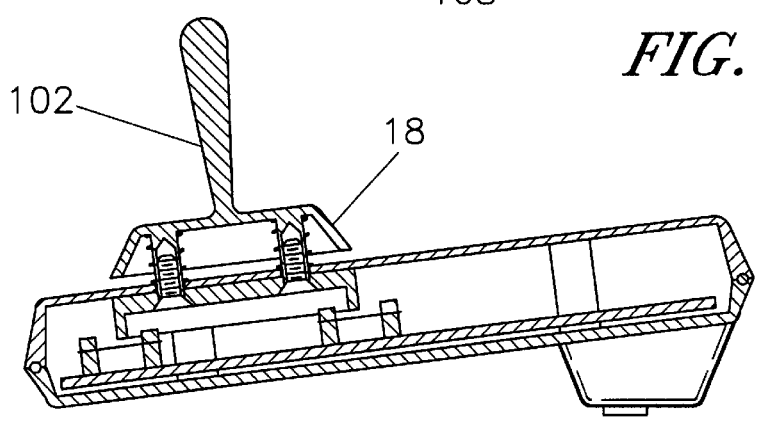
FIG. 10 is a section view through the cursor positioning device of FIG. 2 when molded and without seals showing a joystick type of cursor articulator in accordance with the teachings of this invention.
Figure 11:
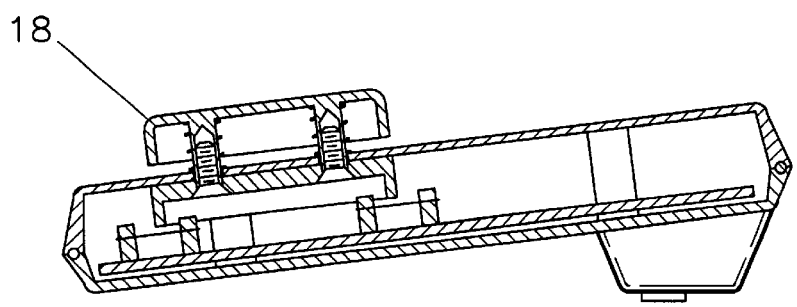
FIG. 11 is a section view through the cursor positioning device of FIG. 2 when molded and without seals, and without keys in accordance with the teachings of this invention.

FIG. 10 shows a cursor positioning device of molded construction similar to FIG. 9 with a joystick 102 forming the top of cursor articulator 18. FIG. 11 shows a mouse of molded construction similar to FIG. 9 with only cursor articulator 18 being used for complete cursor control.

Figure 12:
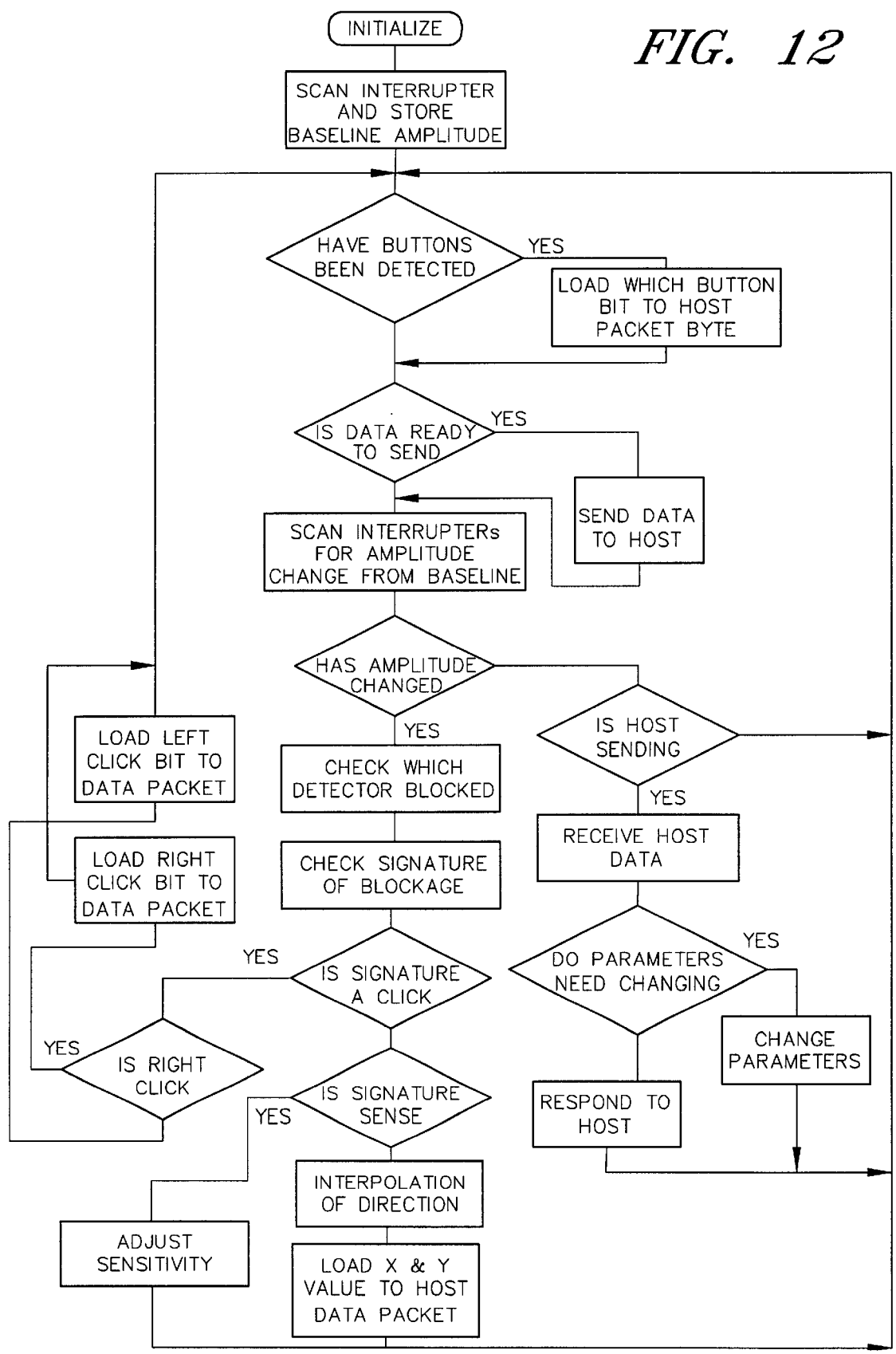
FIG. 12 is a flow diagram illustrating the function of the mouse in accordance with the teachings of this invention.

FIG. 12 is a firmware flow chart of the cursor positioning device, in INITALIZE ports are set to be in either input or output conditions depending on use, ram is tested, and start up sequence with the host is done. Key detection is optical so because emitters and detector vary with age SCAN INTERRUPTER AND STORE BASELINE AMPLITUDE stores a baseline amplitude for the interrupters for buttons 14, 16 and 17, and circular interrupter 145 before the optical beams are blocked. The optical beams are then checked at HAVE BUTTONS BEEN DETECTED for buttons 14, 16 and 17 and compared to the baseline value, if a difference is found at YES the particular button at LOAD WHICH BUTTON BIT TO HOST PACKET BYTE is loaded into a data packet to be sent to the host at an interval time set by the host. If data been loaded into the data packets IS DATA READY TO SEND tests and sends at SEND DATA TO HOST. SCAN INTERRUPTERs FOR AMPLITUDE CHANGE FROM BASELINE scans the inner and outer rings of emitters and detectors shown in FIG. 15. HAS AMPLITUDE CHANGED tests if the circular interrupter 145 has been depressed, if no change is detected then a test is made at IS HOST SENDING to see if the host is requesting data, if no, then a return is made to retest for interrupter detection. If YES at IS HOST SENDING then the data is received and a test is made if parameters need to be changed at DO PARAMETERS NEED CHANGING, if YES, then CHANGE PARAMETERS and return, if no, RESPOND TO HOST as requested and return.

If YES at HAS AMPLITUDE CHANGED then CHECK WHICH DETECTOR BLOCKED, then CHECK SIGNATURE OF BLOCKAGE. A blockage signature is set by the host and is the timing of the on/off duration of how long a detector is blocked. This duration can be set to match a users response time when clicking or double clicking, if a user wants to single or double click very slow or very fast this duration or combination of duration's give a user a blocking signature. By checking this signature at CHECK SIGNATURE OF BLOCKAGE the logic can tell if a click should be sent to the host or a cursor movement should be sent, this test is made at IS SIGNATURE A CLICK, if YES, then test which button at IS RIGHT CLICK, if not right click it must be a left click, load the bit to the data packet to be sent to the host or computer display.

If the signature at IS SIGNATURE A CLICK is not a click then a signature for a sensitivity is checked at IS SIGNATURE SENSE, if yes then the a different ratio is loaded at ADJUST SENSITIVITY and is used to compute the amount of movement of the cursor when sending cursor movement to the host computer. If the check for signature of sensitivity is no, then INTERPOLATION OF DIRECTION is made. With the detectors being in a circle a detector or detectors that are blocked point in the direction the circular interrupter is being depressed. A curve is calculated by the difference in amplitude of the blocked detectors. The calculated peak of this curve combined with the location of the blocked detectors gives the direction to move the cursor. A direction ratio to match the direction of X and Y position is loaded into the data packet to be sent to the host at LOAD X & Y VALUE TO HOST DATA PACKET. The amount of cursor movement in distance on the display is a direct relation to how much of the detector is blocked to the movement delta from the previous movement sent to the host. The direction ratio is only to show direction, by adding to the direction ratio the delta from previous movement a speed and distance of movement of the cursor is made. A sensitivity adjustment can be added to vary the amount of movement of the circular interrupter to the distance traveled by the cursor. Example, at one sensitivity setting moving the circular interrupter one millimeter could move the cursor one hundred millimeters, another sensitivity setting could be moving the circular interrupter a half millimeter could move the cursor two hundred millimeters. This sensitivity adjustment modifies the movement delta. It can be a fixed value for some applications or a user variable in other applications.

After the direction ratio, the movement delta, and the sensitivity are calculated the sum is loaded into the data packet at LOAD X & Y VALUE TO HOST DATA PACKET, then a return to test for buttons is made.

Figure 13:
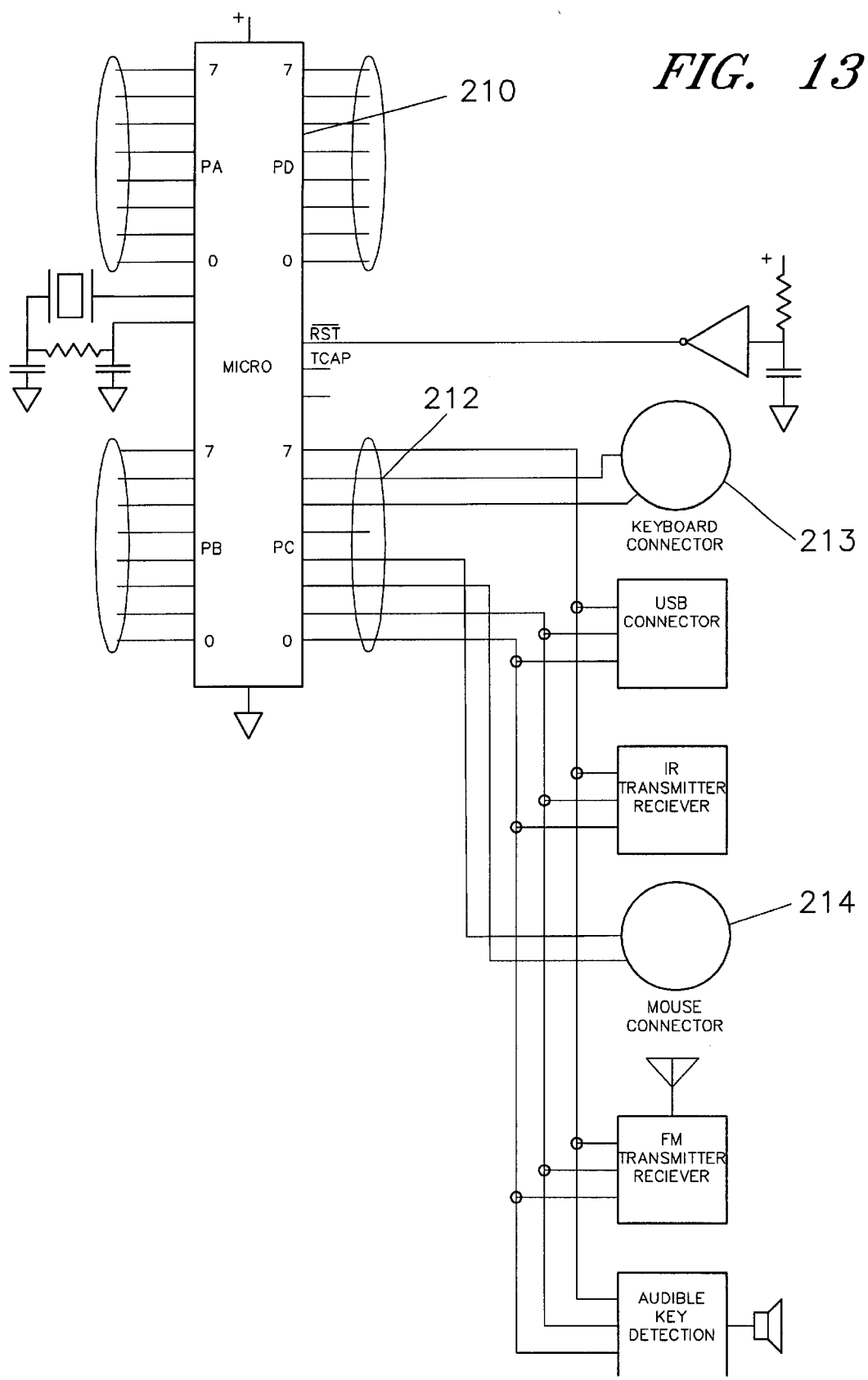
FIG. 13 is a schematic illustrating the microprocessor section of the cursor positioning device in accordance with the teachings of this invention.

FIG. 13 is the micro processor schematic for the cursor positioning device. Cursor positioning device micro processor 210 has various ports under control of the firmware, one such port 212 is shown labeled PC referring to Port C, these ports control the input/output of the mouse, turning on and off the emitters and detectors, and detecting varying voltage amplitudes from the detectors. One such input/output is shown at mouse connector 214. Mouse connector 214 connects to a host computer to send mouse movement, and other signals generated from the cursor positioning device or sent from the host. When the cursor positioning device is used to input movement signatures special programs in the host must be installed to receive these commands. Keyboard connector 213 can be connected to the host so that the cursor positioning device can directly input character strings to any application running on the host without special programs, because the character string could be the same as an operator inputs from a standard host keyboard. Example, if an operator made a movement signature in the twenty-two degree direction it could send a character string with 'tab' to get to the command prompt line in a browser, then 'www.'. This would be a short cut to start inputting a web address.

Figure 14:
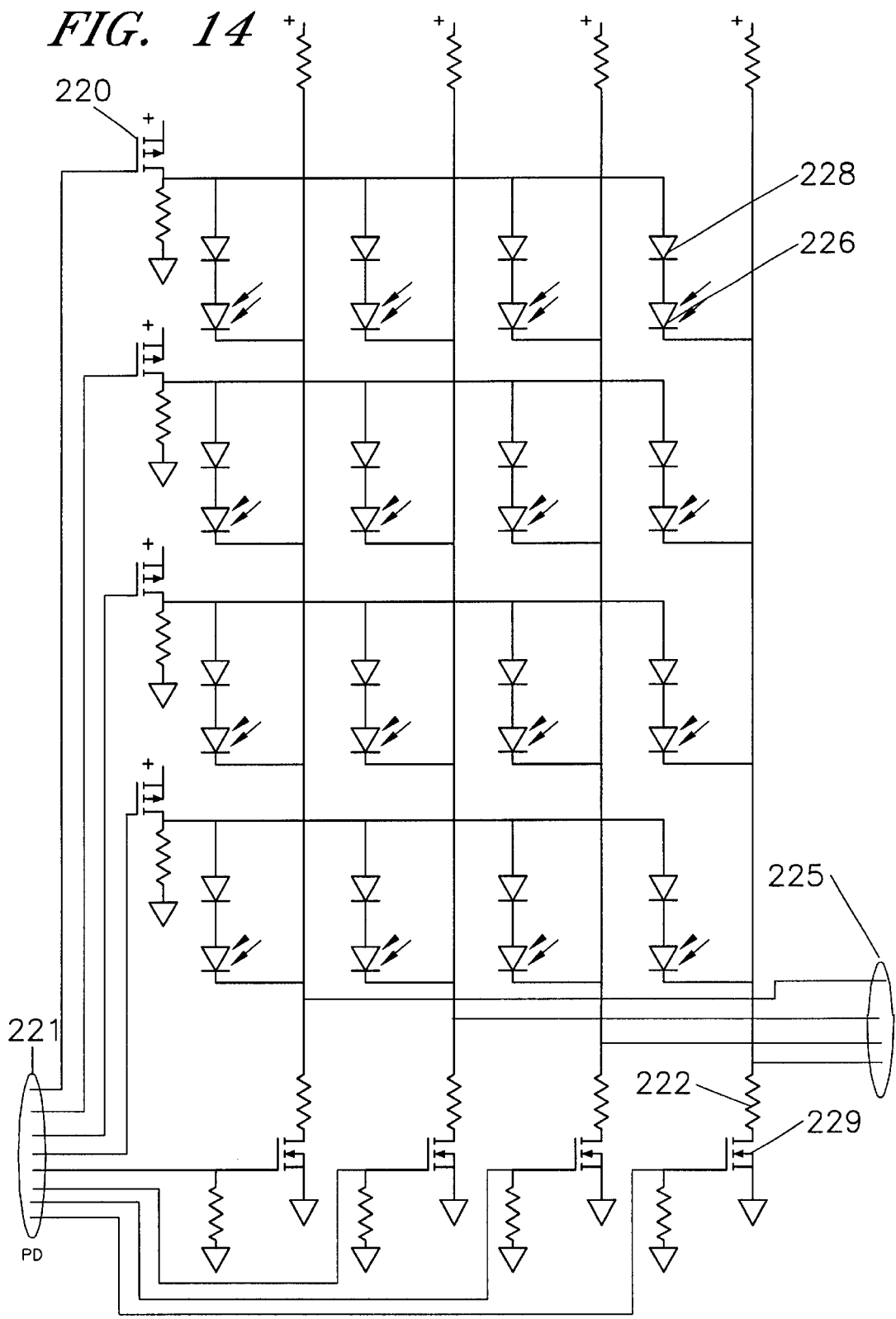
FIG. 14 is a schematic illustrating the elements of a typical detector matrix of the cursor positioning device in accordance with the teachings of this invention.
Figure 15:
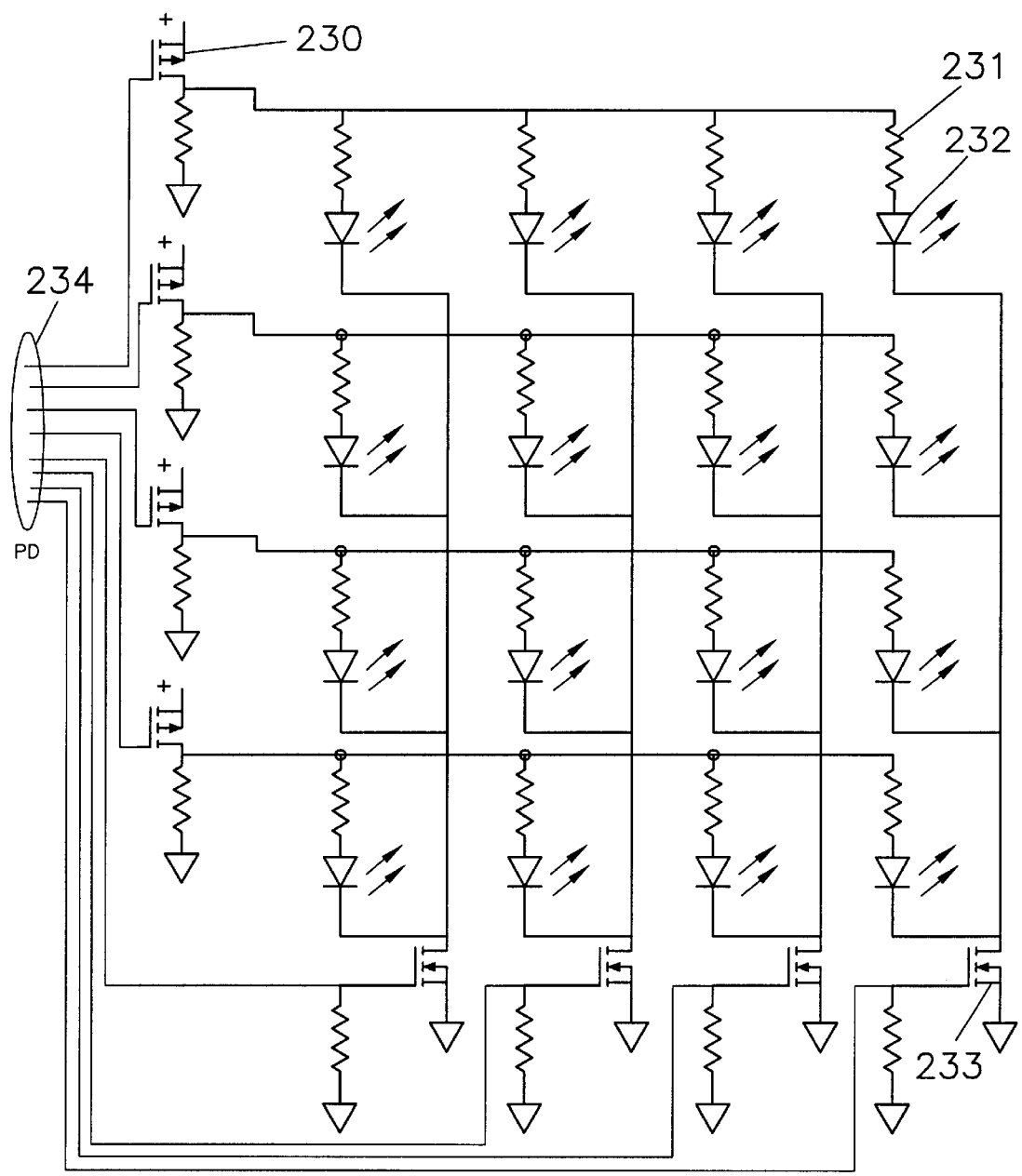
FIG. 15 is a schematic illustrating the elements of a typical emitter matrix of the cursor positioning device in accordance with the teachings of this invention.

The quantities of emitters and detectors can vary with different mice for different applications as shown in FIG. 1 and in FIG. 2. FIG. 14 shows a typical detector matrix, and FIG. 15 shows the detectors matching typical emitter matrix, and depending on the number of detectors and emitters needed in a given mouse these typical matrixes can be increased or increased to match the application. If the application need is a very accurate cursor positioner then more detectors can be used so less interpolation is needed, but if the application need is only for X and Y positioning then only four detectors are needed. In operation PFET 220 is turned on to give a positive bias to reverse blocking diode 228 and detector 226. At the same time NFET 229 is turned on to give a negative bias to the cathode of detector 226 by port 221. A voltage amplitude is then seen across signal resistor 222 and at input port 225. This voltage amplitude will then vary depending on the amount of light that is emitted to detector 226. The amount of light that can be emitted to the detector is governed by the position of the key or cursor positioning interrupter. If the interrupter is not depressed then the majority of the light from an emitter is received by the detector, then depending on the amount of depression by the user on the interrupter varying amounts of light will be seen as voltage amplitude changes at port 225. When the base line amplitude is stored the amplitude is stored when the emitters are not turned on.

In FIG. 15 PFET 230 is turned on by port 234 to give a positive bias to emitter 231 through current limiting resistor 231, NFET 203 is then turned on by port 234 the give a negative bias to emitter 232 thus illuminating emitter 232. Using a matrix like is shown in FIG. 14 and FIG. 15 has two distinct advantages, one being a power saving in overall current drain from the host because the detectors are alternatively turned on, and two, isolating detector emitter pairs to limit cross talk between different detector emitter pairs.

Figure 16:
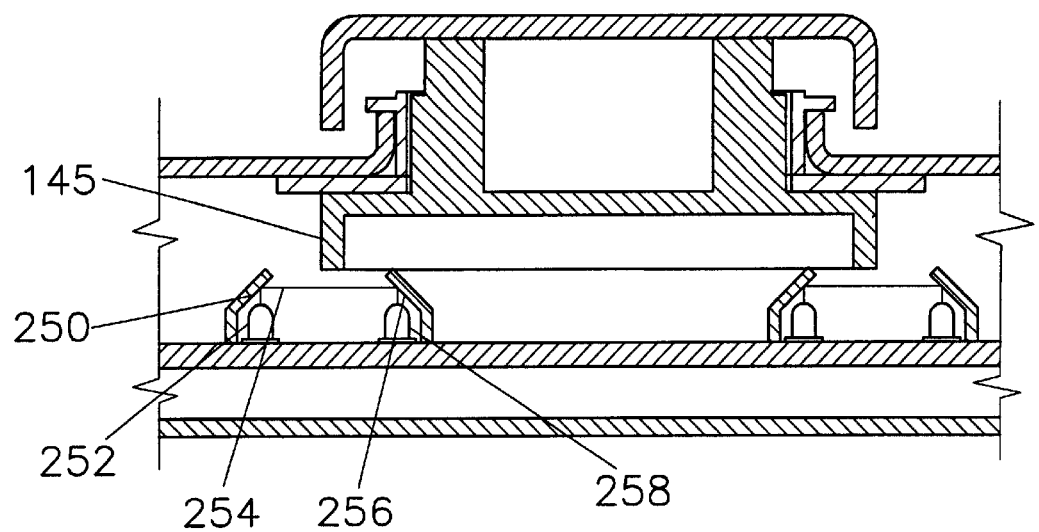
FIG. 16 is an enlarged detail view of FIG. 6 with the circular interrupter in a non-depressed position with an alternative optical design with dual stationary mirrors in accordance with the teachings of this invention.

FIG. 16 is an enlarged detail view 140 of FIG. 6 with the circular interrupter in a non-depressed position showing a light beam 254 being directed from emitter 258 to emitter mirror surface 256 to detector mirror surface 250 to detector 252. The downward movement of circular interrupter 145 will attenuate beam 254 by the amount of downward movement. In this alternate design by increasing the length of beam 254 will increase the divergence of beam 254 and decrease the sensitivity in position of the downward movement.

Figure 17:
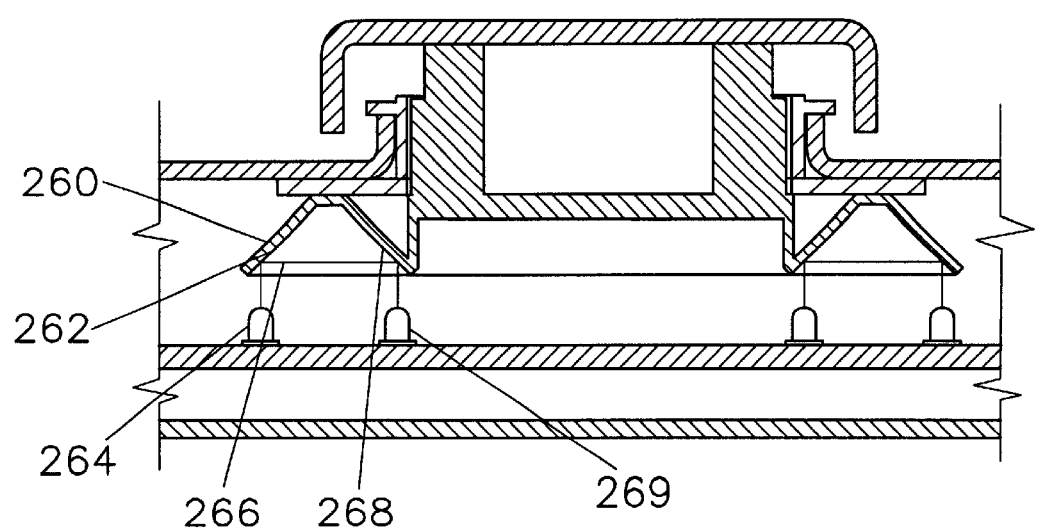
FIG. 17 is an enlarged detail view of FIG. 6 with the circular interrupter in a non-depressed position with an alternative optical design with dual floating mirrors in accordance with the teachings of this invention.

FIG. 17 is an enlarged detail view 140 of FIG. 6 with the circular interrupter in a non-depressed position showing a light beam 266 being directed from emitter 269 to emitter mirror surface 268 to detector mirror surface 262 to detector 264. In this alternate design as mirror circular interrupter 260 is moved in a downward direction the center of beam 266 is directed away from the center of detector 264 thus attenuating the amount of light to detector 264.

Figure 18:
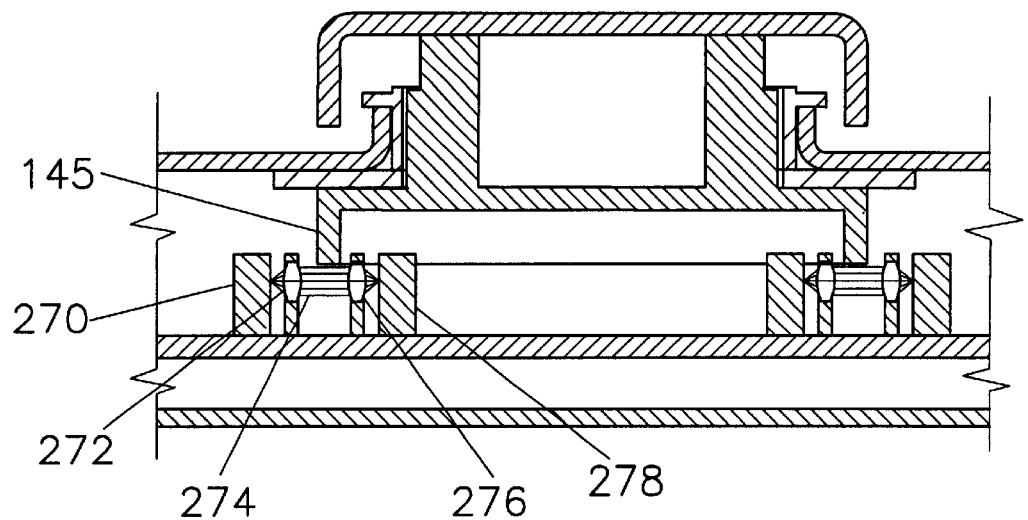
FIG. 18 is an enlarged detail view of FIG. 6 with the circular interrupter in a non-depressed position with an alternative optical design with lenses for collimation in accordance with the teachings of this invention.

FIG. 18 is an enlarged detail view 140 of FIG. 6 with the circular interrupter in a non-depressed position having two lenses to first diverge and then collimate the light beam, thus allowing the circular interrupter 145 a more linear attenuation of light beam 274. Emitter 278 divergent light beam is collimated by emitter lens 276, which is then converged through detector lens 272 to detector 270.

Figure 19:
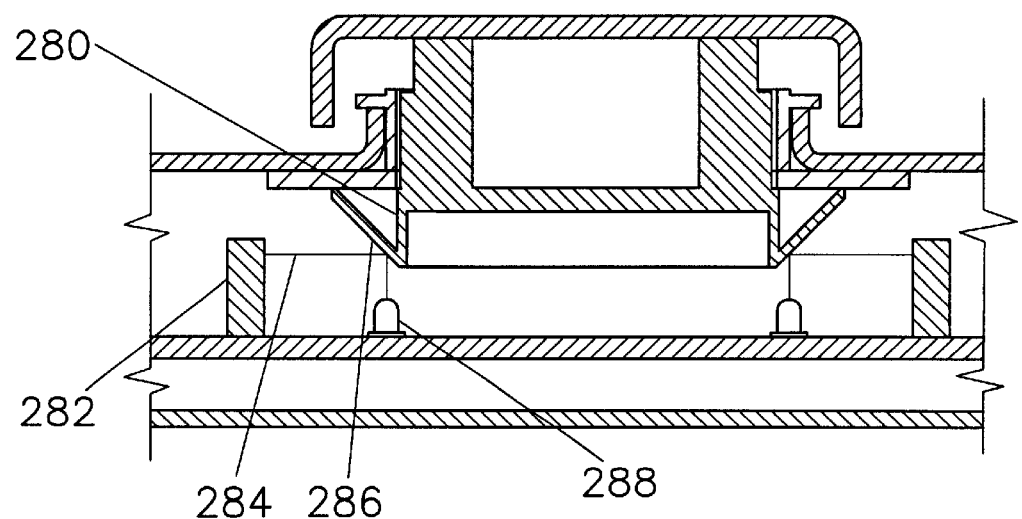
FIG. 19 is an enlarged detail view of FIG. 6 with the circular interrupter in a non-depressed position with an alternative optical design with single floating mirrors in accordance with the teachings of this invention.

FIG. 19 is an enlarged detail view 140 of FIG. 6 with the circular interrupter in a non-depressed position showing a light beam 284 being directed from emitter 288 to emitter mirror surface 286 to detector 282. In this alternate design as mirror circular interrupter 280 is moved in a downward direction the center of beam 284 scans detector 282 thus attenuating the amount of light to detector 282. Detector 282 in this alternative means can be larger with more detection area, be an array with multiple discrete detectors, or a charge surface type detector. This larger detection area allows the distance of circular interrupter 280 ratio to cursor movement to be more linear.

Figure 20:
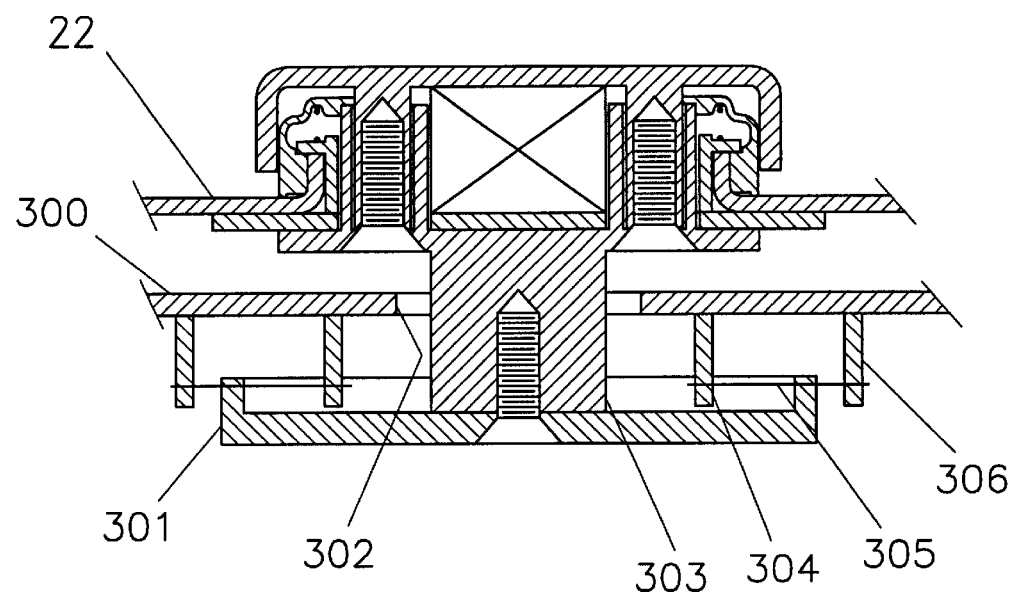
FIG. 20 is an enlarged detail view of FIG. 6 with the circular interrupter in a non-depressed position with an alternative optical design whereas the interrupter is moved out of the optical beam to show direction in accordance with the teachings of this invention.

FIG. 20 is an enlarged detail view 140 of FIG. 6 showing an alternative circular interrupter 301 in a non-depressed position where it is moved out of the optical beam 305 to show cursor direction. Emitter 304 and detector 306 with an optical beam 305 there between being attenuated by circular interrupter 301 secured to circular interrupter support 303 protruding through printed wiring board 300. In this alternative design detector 306 is non-conducting during times of non-use, thus reducing current drain.

Figure 21:
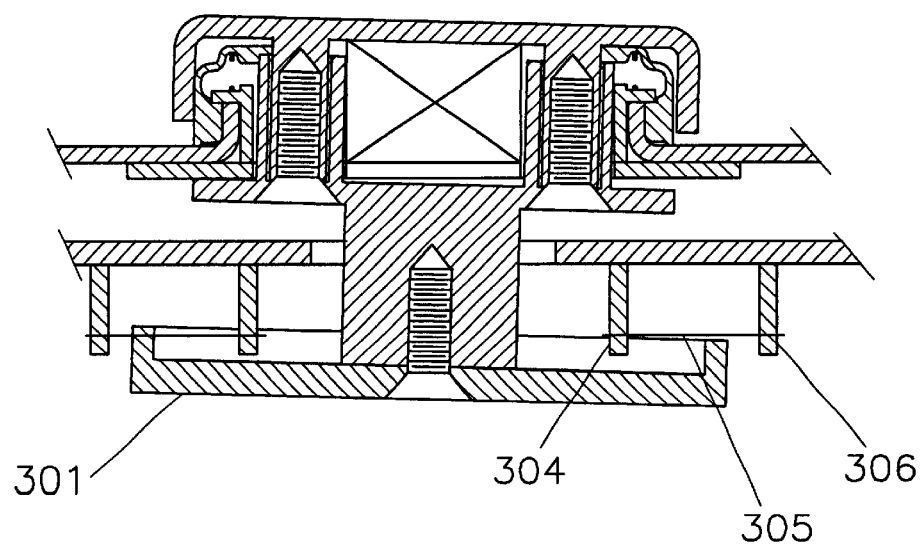
FIG. 21 is an enlarged detail view of FIG. 6 with the circular interrupter in an intermediate position with an alternative optical design showing the interrupter in FIG. 20 partially out of the optical beam in accordance with the teachings of this invention.

FIG. 21 shows alternative circular interrupter 301 of FIG. 20 in an intermediate position only partially blocking optical beam 305 showing the direction of cursor movement.

Figure 22:
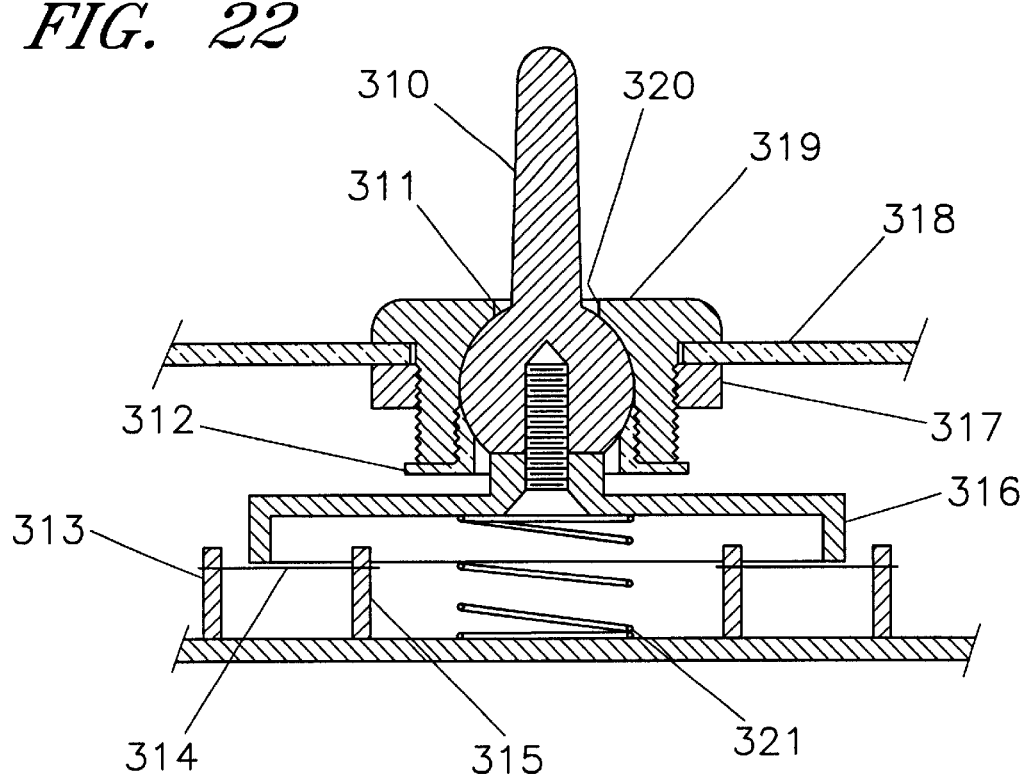
FIG. 22 is a section view FIG. 27 with a pivoting interrupter in a first position or non-depressed position in accordance with the teachings of this invention.
Figure 27:
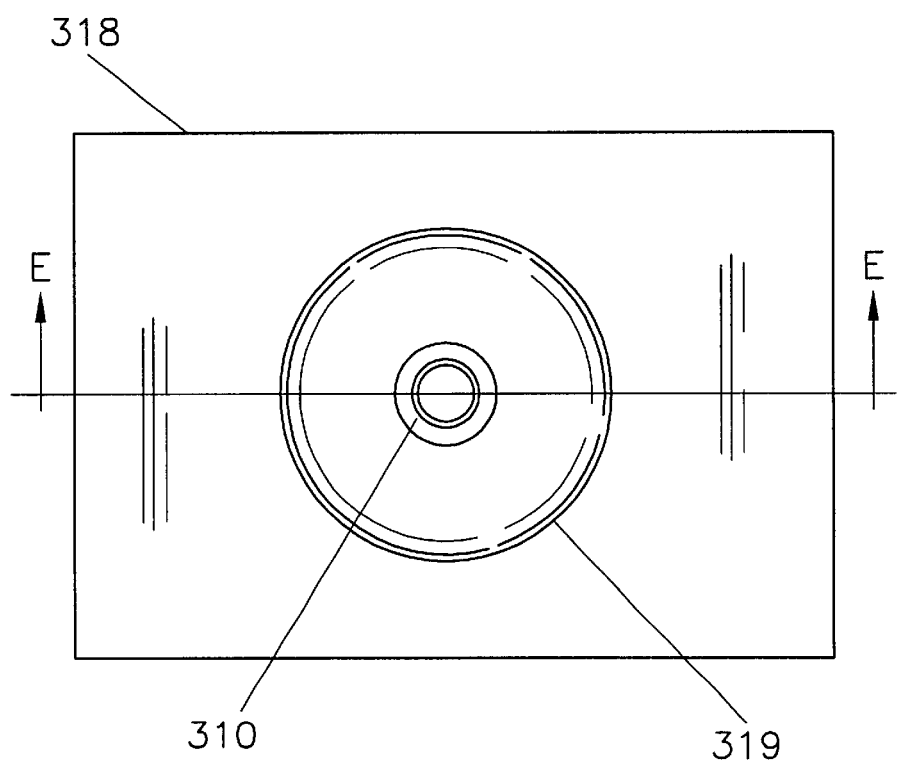
FIG. 27 is a plan view of a cursor positioning device with a pivoting single actuator in accordance with the teachings of this invention.

FIG. 22 shows a section view E—E of FIG. 27 with a pivoting cursor positioning device with interrupter 316 in a non-interrupting position out of the optical beam 314 between emitter 35 and detector 313. Stem articulator 310 with pivot ball 311 is pivotally received in pivot mount 319 and being retained by pressure seal 312. Pivot mount 319 is then retained through top surface 318 by retainer 317. Although centering spring 321 is not necessary for operation it can be used to bias stem articulator 310 to a central position whereby holding interrupter 316 in a non-interrupting position.

Figure 23:
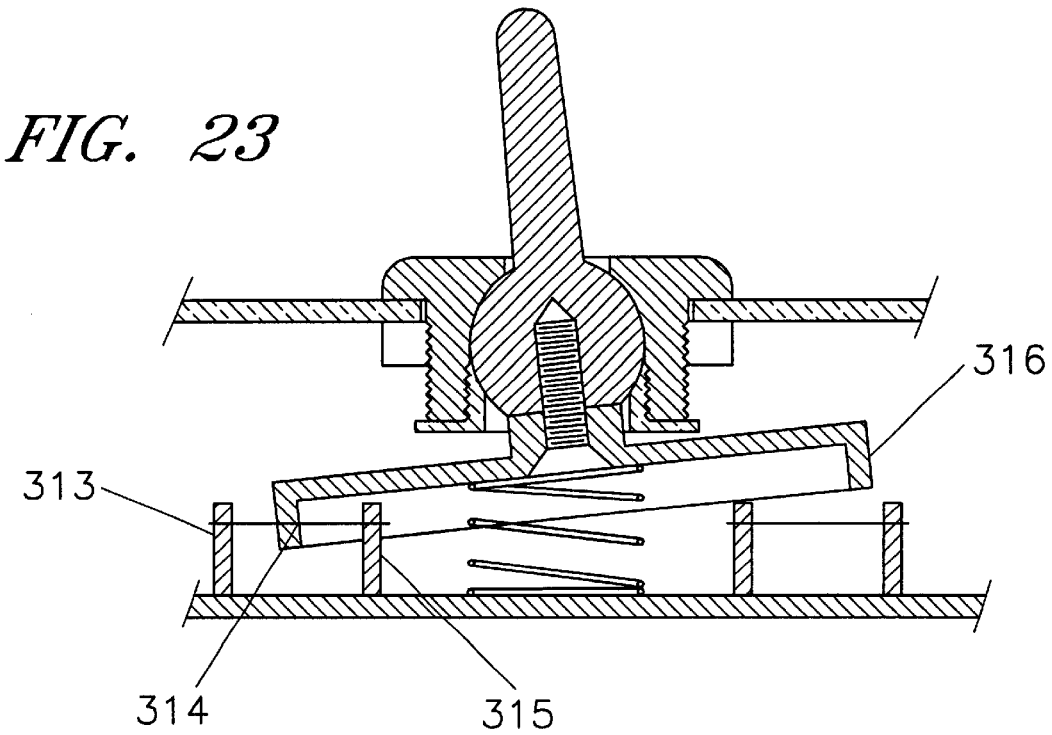
FIG. 23 is a section view of FIG. 27 with the pivoting interrupter of FIG. 22 in an intermediate position blocking the optical beam in accordance with the teachings of this invention.

FIG. 23 shows interrupter 316 of FIG. 22 pivoted to an intermediate position partially blocking optical beam 314 showing cursor direction.

Figure 24:
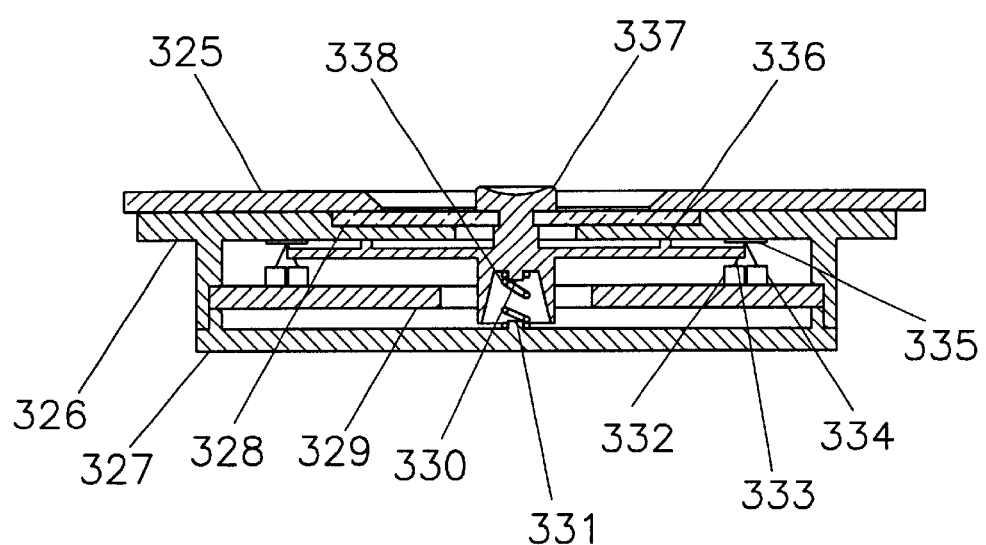
FIG. 24 is a section view of FIG. 26 with a sliding interrupter in a first position or blocking position in accordance with the teachings of this invention.
Figure 26:
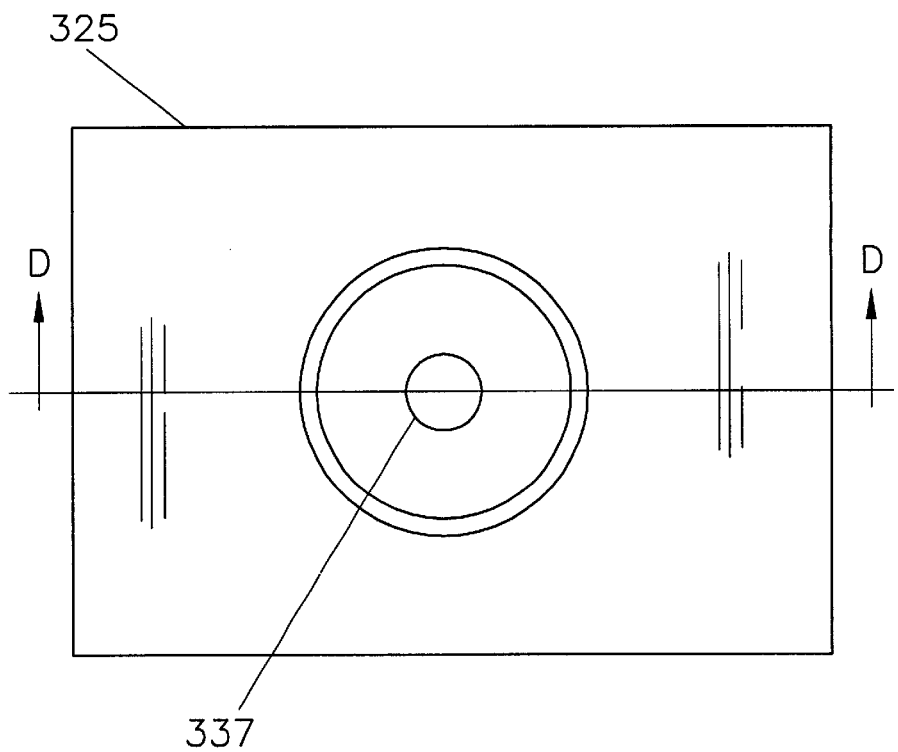
FIG. 26 is a plan view of a cursor positioning device with a sliding single actuator in accordance with the teachings of this invention.

FIG. 24 shows section view D—D of FIG. 26 with a sliding cursor positioning device. In this configuration the cursor position device can be made thinner. Sliding articulator interrupter 337 is disposed through elastomer seal 328 being retained by upper housing 326 against the lower surface of top surface 325. Sliding articulator interrupter 337 is shown blocking optical beam 333 being emitted by emitter 332 mounted on printer wiring board 329. Glide point 336 spaces sliding articulator interrupter 337 from mirror 335, and is the opposing force to central spring 338. When optical beam 333 is not blocked mirror 335 reflects optical beam to detector 334. It should be appreciated that those skilled in the art could substitute hall effect technology and get a similar result. In operation a finger or other object is placed on articulator interrupter 337 and slides articulator interrupter 337 in the direction of desired cursor movement, or by movement signatures input control signals to the host, or computer display. These movement signatures can be input through a mouse input port, or through a keyboard input port in the form of single characters or multiple character strings. When movement is made elastomer seal 328 is elongated in the direction of movement, and when released elastomer seal 328 centralizes articulator interrupter 336 over the ring of emitter 332 and detector 334 pairs. If the application does not require articulator interrupter 337 to be sealed it can be centralized by central spring 338 being installed over upper tab 330 and lower tab 331 of lower cover 327. Lower cover 327 is the opposing force to a vandals blow so it will not contact emitter 332 or detector 334.

Figure 25:
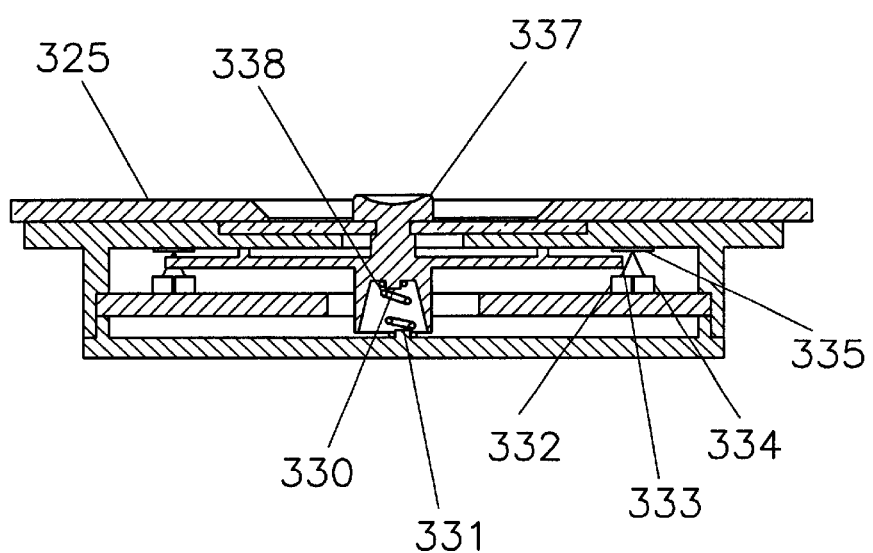
FIG. 25 is a section view of FIG. 26 with the sliding interrupter of FIG. 24 in a second position not blocking the optical beam in accordance with the teachings of this invention.

FIG. 25 shows articulator interrupter 336 in a second position allowing the reflected optical beam 333 to be received by detector 334. In operation to do a right click a user would slide articulator interrupter 337 in the 270 degree direction and then slide it back to the central zone in the time frame necessary to match the movement signature of a right click, and a right click would be input to the host computer display. If the operator would slide articulator interrupter 337 slower then the cursor would move in the angular direction of articulator interrupter 337 was slid. Because slower would not meet the timing signature of a click.

FIG. 26 shows a plan view of a sliding cursor positioning device with top surface 325 and sliding articulator interrupter 337.

FIG. 27 shows a plan view of a pivoting cursor positioning device with top surface 318, pivoting stem articulator interrupter 310 and pivot mount 319.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A cursor positioning device for positioning a cursor on a computer display, comprising in combination:
   a top surface having an opening;
   a cursor positioning articulator above said opening with a connection means through said opening to a positioning interrupter means below said opening;
   said positioning interrupter means having an outer periphery forming a radius;
   an inner and outer ring of optical emitters and detectors disposed around said positioning interrupter;
   said inner and outer ring of optical emitters and detectors having a light beam there between;
   wherein said positioning interrupter means lacks direct connection to said inner and outer ring of optical emitters and detectors;
   said positioning interrupter means has a first position allowing a first amount of emission from said light beam to contact said detector;
   said radius and said ring of optical emitters and detectors have a common centerline in said first position;
   said positioning interrupter means has a second position allowing a second amount of emission from said light beam to contact said detector;
   said radius and said ring of optical emitters and detectors have a different centerline in said second position;
   an electronic circuit that has stored therein an angular position of each said emitter and detector in said inner and outer ring of emitters and detectors; and
   whereby as said positioning interrupter means is moved between said first position toward said second position at least one said emitter of said inner and outer ring of emitters and detectors said emission is varied to at least one said detector therefor equating said emission variance with said angular position an angular direction and cursor movement is derived.

2. A cursor positioning device for positioning a cursor on a computer display as claimed in claim 1, wherein
   an amount said interrupter is moved between said first position toward said second position varying said emission of said emitters to said detectors equating to a distance of cursor movement.

3. A cursor positioning device for positioning a cursor on a computer display as claimed in claim 1, further comprising
   means to transmit said angular direction and said cursor movement to said computer display.

4. A cursor positioning device for positioning a cursor on a computer display as claimed in claim 1, further comprising
   means to scale the amount of movement of said positioning interrupter in relation to said cursor movement on said display.

5. A cursor positioning device for positioning a cursor on a computer display as claimed in claim 1, further comprising
   means to input mouse left button sequences to said computer display by a signature equating to angular location of movement and speed of movement of said articulator.

6. A cursor positioning device for positioning a cursor on a computer display as claimed in claim 1, further comprising means to input mouse right button sequences to said computer display by a signature equating to angular location of movement and speed of movement of said articulator.

7. A cursor positioning device for positioning a cursor on a computer display as claimed in claim 1, further comprising means to adjust sensitivity of said articulator movement verses said cursor movement to said computer display by a signature equating to angular location of movement and speed of movement of said articulator.

8. A cursor positioning device for positioning a cursor on a computer display as claimed in claim 1, further comprising means to input data to said computer display by a signature equating to angular location of movement and speed of movement of said articulator.

9. A cursor positioning device for positioning a cursor on a computer display as claimed in claim 1, further comprising means to seal said cursor positioning device from contaminants.

10. A cursor positioning device for positioning a cursor on a computer display as claimed in claim 1, further comprising an articulator retention means below said top surface to stop said articulator from being removed from above said top surface.

11. A cursor positioning device for positioning a cursor on a computer display as claimed in claim 1, further comprising at least one switch actuator means disposed on said top surface to actuate a switch through said top surface.

12. A cursor positioning device for positioning a cursor on a computer display as claimed in claim 11, further comprising means to input mouse left button sequences to said computer display by actuation of said switch actuator.

13. A cursor positioning device for positioning a cursor on a computer display as claimed in claim 11, further comprising means to input mouse right button sequences to said computer display by actuation of said switch actuator.

14. A cursor positioning device for positioning a cursor on a computer display as claimed in claim 11, further comprising means to input data to said computer display by actuation of said switch actuator.

15. A cursor positioning device for positioning a cursor on a computer display as claimed in claim 11, further comprising a retention means below said top surface to stop said switch actuator from being removed from above said top surface.

16. A cursor positioning device for positioning a cursor on a computer display as claimed in claim 11, further comprising an LED indicator disposed concentric with said switch actuator to indicate said switch actuator has been pressed.

17. A cursor positioning device for positioning a cursor on a computer display as claimed in claim 11, further comprising removable indicia disposed on switch actuator.

18. A cursor positioning device for positioning a cursor on a computer display as claimed in claim 11, further comprising means to adjust sensitivity of said articulator movement verses said cursor movement to said computer display by actuation of said switch actuator.

19. A cursor positioning device for positioning a cursor on a computer display as claimed in claim 1, further including a means to stop fluids from entering said cursor positioning device in the absence of physical seals.

20. A cursor positioning device for positioning a cursor on a computer display as claimed in claim 1, further comprising a means to stop fluids from entering said cursor positioning device if a physical seal fails.

21. A cursor positioning device for positioning a cursor on a computer display as claimed in claim 1, further comprising means for generating, and means for transmitting and receiving data by radio frequency signals responsive to said cursor positioning device operators data entry.

22. A cursor positioning device for positioning a cursor on a computer display as claimed in claim 1, whereby said light beam is directed through lenses to collimated said light beam.

23. A cursor positioning device for positioning a cursor on a computer display as claimed in claim 1, further comprising a first cable to connect to a mouse port, a second cable to connect to a keyboard port, and wherein said second cable inputs keyboard character strings generated from said cursor positioning device.

24. A cursor positioning device for positioning a cursor on a computer display as claimed in claim 1, further comprising at least one mirror placed in said light beam to redirect said light beam.

\* \* \* \* \*